US012793892B2

(12) United States Patent
Taguchi

(10) Patent No.: US 12,793,892 B2
(45) Date of Patent: Nov. 10, 2026

(54) CERAMIC STRUCTURE HAVING A CRACK-RESISTANT IDENTIFICATION MARK

(71) Applicant: Murata Manufacturing Co., Ltd., Kyoto (JP)

(72) Inventor: Takehito Taguchi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 190 days.

(21) Appl. No.: 18/919,893

(22) Filed: Oct. 18, 2024

(65) Prior Publication Data

US 2025/0046517 A1 Feb. 6, 2025

Related U.S. Application Data

(63) Continuation of application No. PCT/JP2023/014804, filed on Apr. 12, 2023.

(30) Foreign Application Priority Data

Apr. 21, 2022 (JP) ................................ 2022-070053

(51) Int. Cl.
*H01G 2/24* (2006.01)
*H01G 4/224* (2006.01)
*H01G 4/30* (2006.01)

(52) U.S. Cl.
CPC ............... *H01G 2/24* (2013.01); *H01G 4/224* (2013.01); *H01G 4/30* (2013.01)

(58) Field of Classification Search
CPC ............. H01G 4/224; H01G 4/30; H01G 2/24
See application file for complete search history.

(56) References Cited

U.S. PATENT DOCUMENTS

2013/0038979 A1* 2/2013 Togashi ................... H01G 4/30 361/301.4
2014/0020942 A1* 1/2014 Cho ....................... H01G 2/065 361/301.4

FOREIGN PATENT DOCUMENTS

| | | | |
|---|---|---|---|
| JP | H04-56118 | A | 2/1992 |
| JP | H04-94102 | A | 3/1992 |
| JP | H07-94357 | A | 4/1995 |
| JP | H08-316084 | A | 11/1996 |
| JP | 2005-166745 | A | 6/2005 |
| JP | 2021-125585 | A | 8/2021 |
| WO | 2015/025951 | A1 | 2/2015 |

OTHER PUBLICATIONS

International Search Report for PCT/JP2023/014804 dated Jun. 6, 2023.

* cited by examiner

*Primary Examiner* — Eric W Thomas
(74) *Attorney, Agent, or Firm* — McDonald Hopkins LLC

(57) ABSTRACT

A ceramic structure including a crack-resistant identification mark. A ceramic structure includes a first ceramic layer including a first main surface and a second main surface opposite to the first main surface; and an identification mark made of ceramics on the first main surface of the first ceramic layer, wherein in a cross section of the identification mark in a direction perpendicular to the first main surface, the identification mark includes multiple continuous sections and a discontinuous section between the continuous sections.

20 Claims, 5 Drawing Sheets

CERAMIC STRUCTURE HAVING A CRACK-RESISTANT IDENTIFICATION MARK

CROSS REFERENCE TO RELATED APPLICATION

This is a continuation of International Application No. PCT/JP2023/014804 filed on Apr. 12, 2023 which claims priority from Japanese Patent Application No. 2022-070053 filed on Apr. 21, 2022. The contents of these applications are incorporated herein by reference in their entireties.

BACKGROUND OF THE DISCLOSURE

Field of the Disclosure

The present disclosure relates to a ceramic structure.

Description of the Related Art

Conventionally, identification marks have been formed on surfaces of ceramic laminates such as LC composite components (e.g., multilayer filters), multilayer ceramic capacitors, and multilayer inductors so that the orientations of these ceramic laminates can be recognized.

For example, Patent Literature 1 discloses a multilayer inductor including: a spiral coil conductor in a rectangular parallelepiped chip obtained by stacking and firing a large number of sheet layers; and marker layers for indicating the positions of lead-out portions of the coil conductor, one located inward from an upper sheet layer and the other one located inward from a lower sheet layer, the upper sheet layer and the lower sheet layer constituting the chip, wherein each marker layer is rectangular with the same width as the chip, two sides of each marker layer on lateral surface sides of the chip are exposed on the two lateral sides of the chip, and one side of each marker layer on an end surface side of the chip is located inward from the end surface of the chip with a predetermined distance from the end surface.

In the multilayer inductor disclosed in Patent Literature 1, the two sides of each marker layer on the lateral surface sides of the chip are exposed on the two lateral surface sides of the chip, and one side of each marker layer on the end surface side of the chip is located inward from the end surface of the chip with a predetermined distance from the end surface, whereby the adhesiveness of the top and bottom sheet layers sandwiching each marker layer is sufficiently maintained. This prevents separation of the marker layers and the sheet layers covering the marker layers during the production process or while the multilayer inductor is being mounted on a board.

In producing the multilayer inductor disclosed in Patent Literature 1, even when air is trapped and remains as air bubbles during the formation of the marker layers, the air bubbles can be extracted from the two sides of each maker layers which are exposed on the lateral surface sides of the chip. This prevents scattering of the marker layers and the sheet layers covering the marker layers, which occurs due to expansion or blowing out of the residual air bubbles during the production process or while the multilayer inductor is being mounted on a board.

Patent Literature 2 discloses a method for producing porous ceramics, the method including: mixing carbonaceous particles with ceramic particles containing at least one selected from the group consisting of aluminum nitride, silicon carbide, and silicon nitride to obtain a mixture such that the ceramic particles are evenly attached to surfaces of the carbonaceous particles; sintering the mixture while pressing the mixture or after pressing the mixture to obtain a sintered body; and then oxidizing and burning out the carbonaceous particles contained in the sintered body.

Patent Literature 1: JP 2005-166745 A

Patent Literature 2: WO 2015/025951

BRIEF SUMMARY OF THE DISCLOSURE

In the multilayer inductor disclosed in Patent Literature 1, the composition of the marker layers is different from the composition of the sheet layers that turn into other base ceramic layers, so that the degree of sintering is different therebetween. Thus, when the marker layers and the sheet layers are simultaneously sintered, the marker layers are prone to cracking due to the difference in shrinkage rate.

Patent Literature 2 also discloses a method for independently controlling the pore shape and porosity of the porous ceramics, but it is silent about a method for preventing cracking during simultaneous firing of a stack of two layers having different degrees of sintering.

The present disclosure was made to solve the above issues and aims to provide a ceramic structure having a crack-resistant identification mark.

The ceramic structure of the present disclosure includes a first ceramic layer including a first main surface and a second main surface opposite to the first main surface and an identification mark made of ceramics on the first main surface of the first ceramic layer, wherein in a cross section of the identification mark in a direction perpendicular to the first main surface, the identification mark includes multiple continuous sections and a discontinuous section between the continuous sections.

The present disclosure can provide a ceramic structure including a crack-resistant identification mark.

DETAILED DESCRIPTION OF THE DISCLOSURE

Hereinafter, a ceramic structure of the present disclosure is described.

The present disclosure is not limited to the following preferred embodiments, and may be suitably modified without departing from the gist of the present disclosure. Combinations of two or more preferred features described in the following preferred embodiments are also within the scope of the present disclosure.

The ceramic structure of the present disclosure includes a first ceramic layer including a first main surface and a second main surface opposite to the first main surface and an identification mark made of ceramics on the first main surface of the first ceramic layer, wherein in a cross section of the identification mark in a direction perpendicular to the first main surface, the identification mark includes multiple continuous sections and a discontinuous section between the continuous sections.

In other words, in the ceramic structure of the present disclosure, the identification mark includes disconnected portions. Thus, even if stress is generated, the stress can be easily dispersed. Thus, the ceramic structure of the present disclosure is considered to be a ceramic structure including a crack-resistant identification mark.

The ceramic structure of the present disclosure is useful as a part of a ceramic laminate such as an LC composite component (e.g., a multilayer filter), a multilayer ceramic capacitor, or a multilayer inductor. In addition to the ceramic laminate structure, the ceramic structure of the present disclosure can also be used as a part of a ceramic structure that requires visually recognizable information.

Hereinafter, embodiments of the ceramic structure of the present disclosure are described with reference to the drawings.

First Embodiment

First, a ceramic laminate including a ceramic structure according to a first embodiment of the present disclosure is described.

Figure 1A:
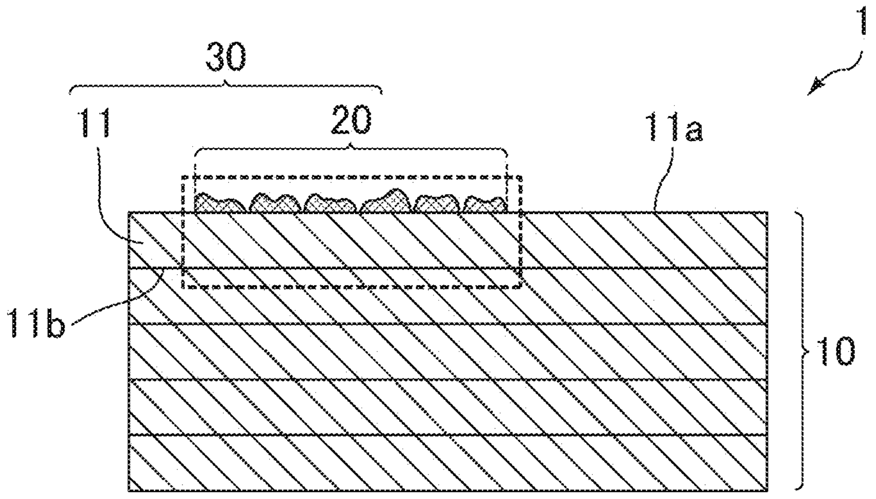
FIG. 1A is a schematic cross-sectional view of an example of a ceramic laminate including a ceramic structure according to a first embodiment of the present disclosure.

FIG. 1A is a schematic cross-sectional view of an example of the ceramic laminate including the ceramic structure according to the first embodiment of the present disclosure.

Figure 1B:
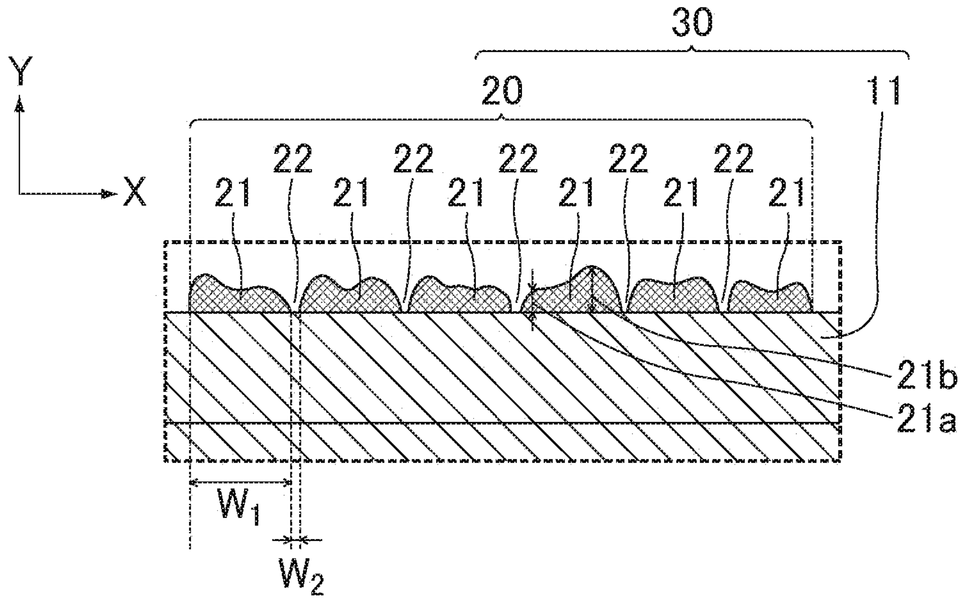
FIG. 1B is an enlarged view of a dashed line portion in FIG. 1A.

FIG. 1B is an enlarged view of a dashed line portion in FIG. 1A.

A ceramic laminate 1 shown in FIG. 1A includes a stack of multiple ceramic layers 10.

The multiple ceramic layers 10 include a first ceramic layer 11 (the ceramic layer at the top in FIG. 1A) on its outermost layer. The first ceramic layer 11 includes a first main surface 11*a* and a second main surface 11*b* opposite to the first main surface 11*a*.

In the ceramic laminate 1, the first main surface 11*a* of the first ceramic layer 11 is exposed to the outside.

An identification mark 20 made of ceramics is formed on the first main surface 11*a* of the first ceramic layer 11.

The structure including the first ceramic layer 11 and the identification mark 20 is a ceramic structure 30 according to the first embodiment of the present disclosure.

As shown in FIG. 1B, in a cross section of the identification mark 20 in a direction perpendicular to the first main surface 11*a*, the identification mark 20 includes multiple continuous sections 21 and multiple discontinuous sections 22, each discontinuous section 22 being located between the continuous sections 21.

In the ceramic structure 30, the identification mark 20 includes disconnected portions. Thus, even if stress is generated, the stress can be easily dispersed. Thus, the ceramic structure 30 is considered to be a ceramic structure including a crack-resistant identification mark.

In particular, cracking in the identification mark 20 during production of the ceramic structure 30 can be prevented as described below.

The first ceramic layer 11 and the identification mark 20 are formed by firing. At this point, the first ceramic layer 11 and the identification mark 20 shrink. When the shrinkage rate (the degree of sintering) of the first ceramic layer 11 is different from the shrinkage rate (the degree of sintering) of the identification mark 20, stress is easily generated in the identification mark 20. However, as described above, the stress is easily dispersed at the identification mark 20, which can prevent cracking in the identification mark 20.

Hereinafter, preferred embodiments of the identification mark 20 are described.

As shown in FIG. 1B, in the ceramic structure 30, preferably, a width $W_2$ of each discontinuous section 22 is smaller than a width $W_1$ of the continuous section 21 adjacent to the discontinuous section 22.

The identification mark 20 when configured as described above has a better visibility.

Preferably, the width $W_2$ of each discontinuous section 22 is 0.1 times or more and 0.9 times or less of the width $W_1$ of each continuous section 21.

Herein, the width $W_1$ of each continuous section 21 and the width $W_2$ of each discontinuous section 22 can be measured by the following method.

The ceramic structure 30 is cut through the identification mark 20 in the direction perpendicular to the first main surface 11*a*, and the resulting cross section is photographed using a scanning electron microscope (SEM) at a magnification of 1000 times to 2000 times. Next, the SEM image is binarized into the continuous section and the discontinuous section, and a boundary therebetween is clarified.

In the SEM image, the length of each continuous section 21 and the length of each discontinuous section 22 in a direction (the direction indicated by arrow X in FIG. 1B) perpendicular to a thickness direction (the direction indicated by arrow Y in FIG. 1B) are the width $W_1$ of each continuous section 21 and the width $W_2$ of each discontinuous section 22, respectively.

In the ceramic structure of the present disclosure, the width of each discontinuous section may be equal to or greater than the width of the continuous section adjacent to the discontinuous section.

As shown in FIG. 1B, in the ceramic structure 30, each continuous section 21 includes a thin portion 21*a* that is thin in the thickness direction Y and a thick portion 21*b* that is thick in the thickness direction Y.

When each continuous section 21 includes the thin portion 21*a* and the thick portion 21*b*, even if a difference is generated between the shrinkage rate of the identification mark 20 and the shrinkage rate of the first ceramic layer 11 during firing, the difference can be absorbed, which can prevent cracking in the identification mark 20.

The presence of the thin portion 21*a* and the thick portion 21*b* means that each continuous section 21 has irregularities formed on its surface. The surface roughness Rz of the surface of the continuous section 21 is preferably 1 μm or more, more preferably 1 μm or more and 3 μm or less.

The surface roughness Rz (JIS B 0601-2001) of the surface of the continuous section 21 can be measured using image analysis software on the SEM image described above.

In the ceramic structure of the present disclosure, the identification mark may have a uniform thickness.

In the ceramic structure 30, the percentage of the total area of the discontinuous sections 22 relative to the total area of the continuous sections 21 and the discontinuous sections 22 is preferably 20% or more and 50% or less, more preferably 30% or more and 40% or less.

When the percentage is less than 20%, the percentage of the continuous sections is too large, so that cracking easily occurs.

When the percentage is more than 50%, the visibility of the entire identification mark tends to reduce.

The areas of the continuous sections 21 and the discontinuous sections 22 can be measured using image analysis software on the SEM image described above.

In the ceramic structure 30, the thickness of the identification mark 20 is preferably 4 μm or more and 10 μm or less, more preferably 4 μm or more and 9 μm or less.

When the thickness of the identification mark 20 is 4 μm or more and 10 μm or less, the visibility can be ensured, and structural defects can be prevented or reduced.

The thickness of the identification mark 20 means a value determined as follows.

In the SEM image described above, a maximum distance portion in the thickness direction Y of the identification mark 20 is regarded as a central portion of the identification mark. The thickness of a first portion that is 10 μm away from the central portion of the identification mark toward the right side in the X direction is measured. The thickness of a second portion that is further 10 μm away from the first portion toward the right side is also measured.

The thickness of a third portion that is 10 μm away from the central portion of the identification mark toward the left side in the X direction is measured. The thickness of a fourth portion that is further 10 μm away from the third portion toward the left side is also measured.

An average thickness of the portions including the central portion, first portion, second portion, third portion, and fourth portion is regarded as "the thickness of the identification mark".

When the first portion is located at the discontinuous section 22, the thickness of the first portion is excluded from calculation of "the thickness of the identification mark". The same applies to the second to fourth portions.

In the ceramic structure 30, the identification mark 20 may display any information. It may be a direction mark that indicates the direction or a front and back identification mark that indicates the front or back of the ceramic structure 30.

In the ceramic structure 30, it suffices as long as the identification mark 20 is visually distinguishable from the multiple ceramic layers 10. For example, preferably, the identification mark 20 contains a glass material and at least one selected from the group consisting of Mn, Co, $Al_2O_3$, $TiO_2$, and $ZrSiO_4$.

When the identification mark 20 contains Mn, the identification mark 20 is blackish. When the identification mark 20 contains Mn, the identification mark 20 may further contain Cr.

When the identification mark 20 contains Co, the identification mark 20 is blueish.

When the identification mark 20 contains at least one of $Al_2O_3$, $TiO_2$, or $ZrSiO_4$, the identification mark 20 is whitish.

Examples of the glass material include lead glass and borosilicate glass.

Next, preferred embodiments of the first ceramic layer 11 and the other ceramic layers 10 are described.

Preferably, the first ceramic layer 11 and the ceramic layers 10 are fired ceramic green sheets. The ceramic green sheets can be obtained, for example, by molding a ceramic slurry on a carrier film by a method such as doctor blading.

The ceramic slurry may contain, for example, a ceramic powder, a binder, a plasticizer, and the like. As the ceramic material, for example, a low temperature co-fired ceramic (LTCC) material can be used. The low temperature co-fired ceramic material is a ceramic material that can be sintered at a temperature of 1000° C. or lower and that can be co-fired with low-resistive materials such as Au, Ag, Cu, and the like. Specific examples of the low temperature co-fired ceramic material include glass composite-based low-temperature co-fired ceramic materials in which a ceramic material such as alumina, zirconia, magnesia, or forsterite is mixed with borosilicate glass; crystallized glass-based low-temperature co-fired ceramic materials containing ZnO—MgO—$Al_2O_3$—$SiO_2$-based crystallized glass; and non-glass low-temperature co-fired ceramic material containing a BaO—$Al_2O_3$—SiO-based ceramic material or a $Al_2O_3$—CaO—SiO—MgO—$B_2O_3$-based ceramic material.

The thickness of each of the first ceramic layer 11 and the other ceramic layers 10 is preferably 5 μm or more and 100 μm or less, for example.

Next, a method for producing the ceramic laminate 1 is described. The method for producing the ceramic laminate 1 includes (1) preparing a ceramic green sheet stack, (2) preparing an identification mark slurry, (3) printing the identification mark slurry, (4) stacking, and (5) firing.

(1) Ceramic Green Sheet Stack Preparing Step

Figure 2:
FIG. 2 is a schematic step view of preparing a ceramic green sheet stack in a method for producing a ceramic laminate.

FIG. 2 is a schematic step view of preparing a ceramic green sheet stack in a method for producing a ceramic laminate.

First, optional amounts of an LTCC green sheet ceramic material, a binder, and a plasticizer are mixed to produce a slurry.

Next, the slurry is applied to a carrier film and molded into a sheet. A lip coater or doctor blade can be used to apply the slurry. Preferably, the slurry is molded to have a thickness of 5 to 100 μm.

An LTCC green sheet (hereinafter described as a "first ceramic green sheet 41") made of a ceramic material, which is shown in FIG. 2, can be formed by the above method.

A via or an electrode pattern may be formed in or on the first ceramic green sheet 41, if necessary.

When forming a via, first, a via hole for vertical electrical conduction is formed in the first ceramic green sheet 41.

The via hole can be formed by mechanical punching, $CO_2$ laser irradiation, UV laser irradiation, or the like. The hole diameter of the via hole is preferably φ20 to φ200 μm.

Subsequently, a conductive powder, a plasticizer, and a binder are mixed to produce a via hole filling conductive paste, and the via hole is filled with the via hole filling conductive paste.

The composition of the via hole filling conductive paste may be one known in the relevant field.

A co-base material (ceramic material) for adjusting the shrinkage rate may be added to the conductive paste.

Next, a conductive powder, a plasticizer, and a binder are mixed to produce a circuit forming conductive paste, and the circuit forming conductive paste is printed on a surface of the first ceramic green sheet 41 to form an electrode pattern.

The electrode pattern may include an electrode for forming a resonator or an electrode for forming capacitance.

Examples of printing methods include screen printing, inkjet printing, and gravure printing.

(2) Preparing Identification Mark Slurry

Figure 3:
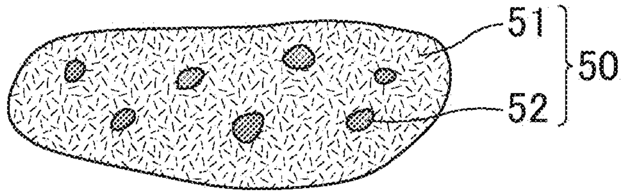
FIG. 3 is a schematic step view of preparing an identification mark slurry in the method for producing a ceramic laminate.

FIG. 3 is a schematic step view of preparing an identification mark slurry in the method for producing a ceramic laminate.

Next, as shown in FIG. 3, optional amounts of a ceramic material 51, an insoluble resin material 52, a binder, and a plasticizer are mixed to produce an identification mark slurry 50. The insoluble resin material 52 is insoluble in the identification mark slurry 50.

The identification mark slurry 50 is fired as described later and turned into an identification mark. The ceramic material 51 in the identification mark slurry 50 is not limited as long as it is a material that makes the color of the identification mark different from the color of the ceramic layer after firing. Preferably, the ceramic material in the identification mark slurry is a material that contains a glass material and at least one selected from the group consisting of Mn, Co, $Al_2O_3$, $TiO_2$, and $ZrSiO_4$.

When the identification mark slurry 50 contains Mn, the identification mark is blackish after firing.

When the identification mark slurry 50 contains Co, the identification mark is blueish after firing.

When the identification mark slurry 50 contains at least one of $Al_2O_3$, $TiO_2$, or $ZrSiO_4$, the identification mark is whitish after firing.

Examples of the glass material include lead glass and borosilicate glass.

The identification mark slurry 50 contains the insoluble resin material 52.

Any component that is thermally decomposed in firing (described later) may be used as the material of the insoluble resin material 52. Examples include an acrylic resin, a polyethylene resin, and polypropylene.

The average particle size of the insoluble resin material 52 is not limited, but it is preferably 0.9 μm or more and 10 μm or less, more preferably 1.5 μm or more and 5 μm or less.

The weight percentage of the insoluble resin material 52 in the identification mark slurry 50 is preferably 20 wt % or more and 40 wt % or less.

Properties such as size and shape of the continuous sections and the discontinuous sections of the identification mark formed by firing (described later) can be adjusted by adjusting the average particle size and weight percentage of the insoluble resin material 52.

(3) Printing the Identification Mark Slurry

Figure 4:
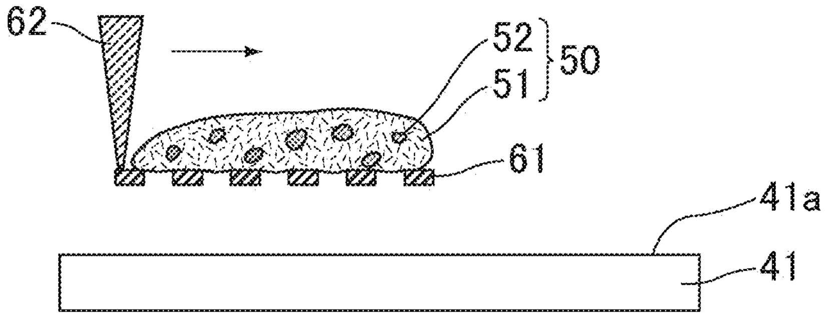
FIG. 4 is a schematic step view of printing the identification mark slurry in the method for producing a ceramic laminate.

FIG. 4 is a schematic step view of printing the identification mark slurry in the method for producing a ceramic laminate.

Next, as shown in FIG. 4, the identification mark slurry 50 is placed on a mesh 61 provided on a printing plate, and a squeegee 62 is moved, whereby the identification mark slurry 50 is screen printed on a first main surface 41*a* of the first ceramic green sheet 41.

Properties such as size and shape of the continuous sections and the discontinuous sections of the identification mark formed by firing (described later) can be adjusted by adjusting the opening size of the mesh 61. Specifically, a reduction in the opening size of the mesh 61 results in a larger number of discontinuous sections and a smaller width of each continuous section. An increase in the opening size of the mesh 61 results in a smaller number of discontinuous sections and a larger width of each continuous section.

An increase in the wire diameter of the mesh 61 results in a larger width of each discontinuous section.

(4) Stacking

Figure 5:
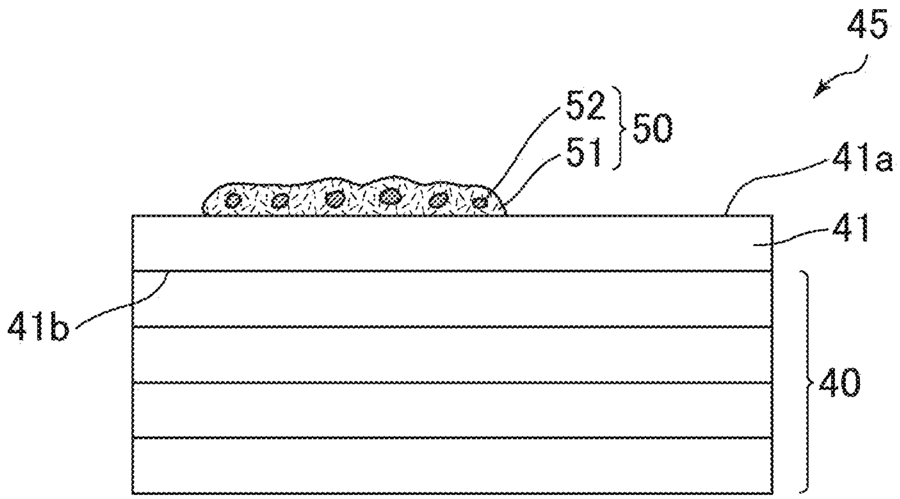
FIG. 5 is a schematic step view of stacking in the method for producing a ceramic laminate.

FIG. 5 is a schematic step view of stacking in the method for producing a ceramic laminate.

Next, as shown in FIG. 5, other ceramic green sheets 40 are stacked on a second main surface 41*b* (i.e., a lower side in FIG. 5) of the first ceramic green sheet 41 on which the identification mark slurry 50 is arranged, whereby the ceramic green sheet stack 45 is produced. A via or an electrode pattern may be formed in or on the ceramic green sheet(s) 40.

Subsequently, the ceramic green sheet stack 45 is placed in a die for pressure bonding. Preferably, the pressure and the temperature are optionally set according to the type, shape, and the like of the ceramic green sheet stack.

Next, the pressure-bonded ceramic green sheet stack is cut into individual pieces.

Examples of cutting methods include methods using a dicer, a guillotine cut, a laser, or the like.

Cutting may be followed by barreling, if necessary.

(5) Firing

Figure 6:
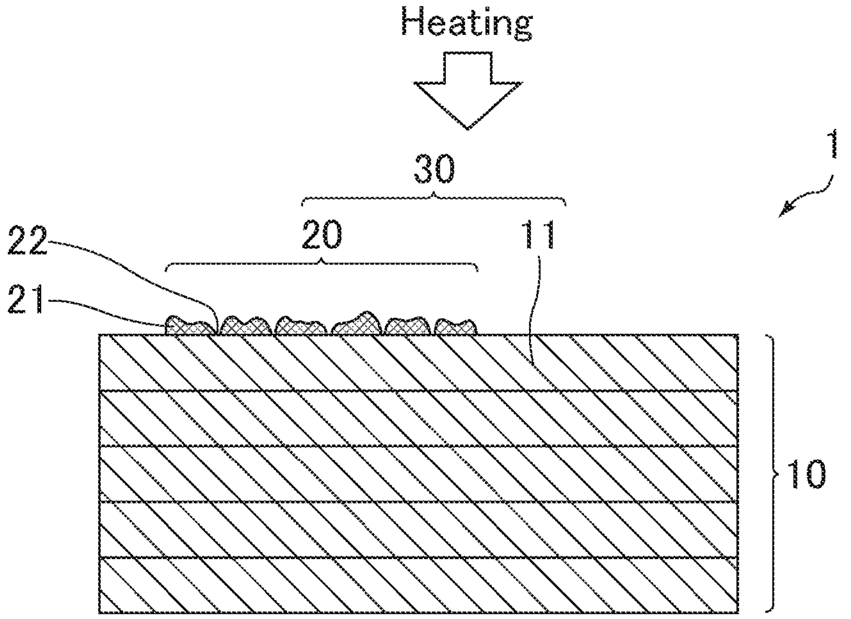
FIG. 6 is a schematic step view of firing in the method for producing a ceramic laminate.

FIG. 6 is a schematic step view of firing in the method for producing a ceramic laminate.

Next, as shown in FIG. 6, the ceramic green sheet stack 45 is fired. Firing conditions are not limited. Preferably, the firing conditions are suitably set according to materials, shapes, and the like of the ceramic green sheet stack 45 and the identification mark slurry 50.

A firing furnace for firing may be a batch furnace or a belt furnace.

In this step, the ceramic green sheet stack 45 is fired into the ceramic laminate 1, and the identification mark slurry 50 is fired into the identification mark 20.

At this point, the insoluble resin material 52 in the identification mark slurry 50 is burned out due to thermal decomposition, whereby the discontinuous sections 22 are formed.

The first ceramic green sheet 41 is turned into the first ceramic layer 11 and the other ceramic green sheets are turned into the other ceramic layers 10.

The width of each continuous section, the width of each discontinuous section, the thickness of each continuous section (the thickness of the identification mark), the surface roughness Rz of each continuous section, and the percentage of the total area of the discontinuous section can be controlled by adjusting the average particle size and weight percentage of the insoluble resin material in the identification mark slurry, the opening size of the mesh, and the amount of the identification mark slurry to be arranged on the first main surface of the ceramic green sheet.

The ceramic laminate 1 can be produced through the above steps.

In the method for producing the ceramic laminate 1, the identification mark slurry is printed by screen printing, but the identification mark slurry may be printed by inkjet printing or gravure printing instead of screen printing.

Second Embodiment

Next, a ceramic laminate including a ceramic structure according to a second embodiment of the present disclosure is described.

In the ceramic structure according to the second embodiment of the present disclosure, the identification mark is located inside the ceramic structure. Such a ceramic structure is described with reference to the drawings.

Figure 7:
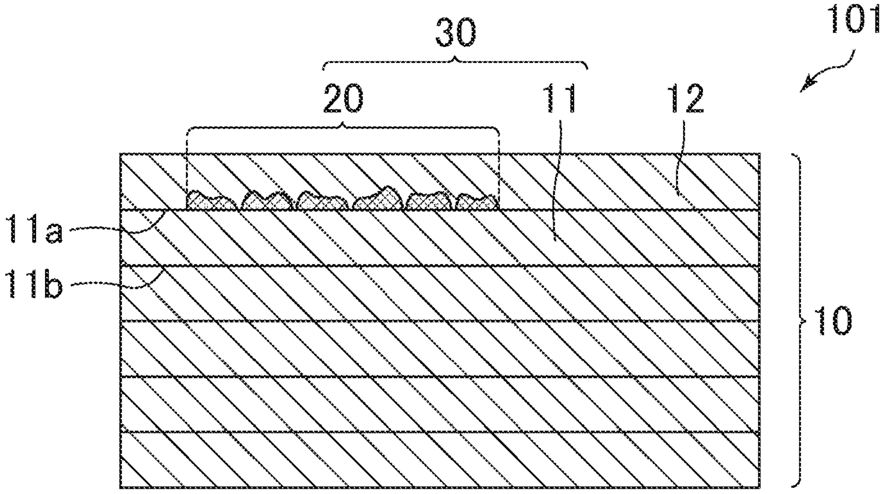
FIG. 7 is a schematic cross-sectional view of an example of a ceramic laminate including a ceramic structure according to a second embodiment of the present disclosure.

FIG. 7 is a schematic cross-sectional view of an example of the ceramic laminate including the ceramic structure according to the second embodiment of the present disclosure.

A ceramic laminate 101 shown in FIG. 7 has the same structure as the ceramic laminate 1, except that a single second ceramic layer 12 is stacked on the first ceramic layer 11 of the ceramic laminate 1.

In other words, the second ceramic layer 12 is stacked in contact manner on the first main surface 11*a* of the first ceramic layer 11, and the identification mark 20 is located between the first ceramic layer 11 and the second ceramic layer 12.

In the ceramic laminate 101, the second ceramic layer 12 is located on the outermost layer, and the first ceramic layer 11 is located inward therefrom.

In the ceramic laminate 101, the identification mark 20 is located between the first ceramic layer 11 and the second ceramic layer 12, so that the identification mark 20 is not exposed to the outside.

This can prevent cracking in the identification mark 20 due to friction or collision between the identification mark 20 and an external member.

In addition, since both the first ceramic layer 11 and the second ceramic layer 12 support the identification mark 20, even if stress is generated in the identification mark 20, the identification mark 20 is less prone to cracking.

The identification mark 20 is located at a portion preferably 10 μm or more and 50 μm or less, more preferably 25 μm or more and 50 μm or less, away from a surface of the ceramic laminate 101 in the thickness direction.

When the identification mark 20 is located at such a portion, the visibility of the identification mark 20 can be sufficiently ensured. In addition, the external force is not easily transmitted to the identification mark 20, which can prevent cracking in the identification mark 20.

The ceramic laminate 101 may be produced by the method for producing the ceramic laminate according to the first embodiment of the present disclosure, except that in "(4) stacking", another single ceramic green sheet that turns into a second ceramic layer is stacked on the first main surface 41*a* of the first ceramic green sheet 41 to produce a ceramic green sheet stack.

Next, a variation of the second embodiment of the present disclosure is described.

Figure 8:
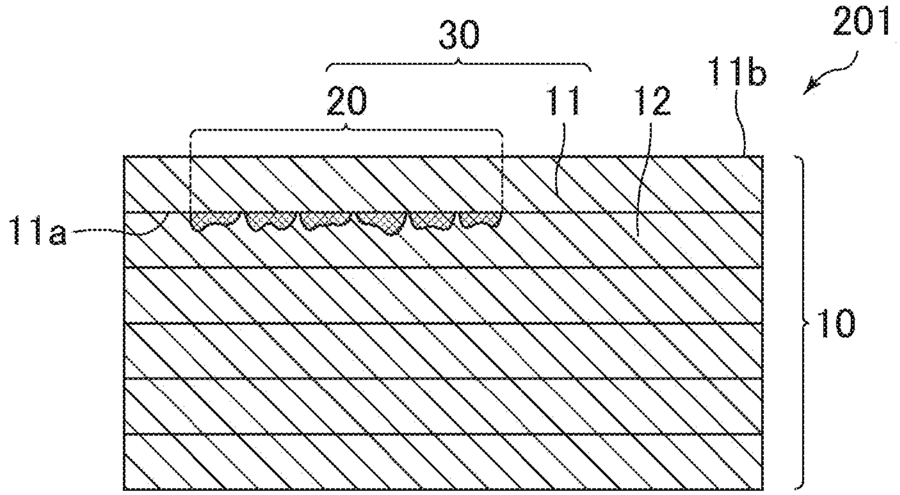
FIG. 8 is a schematic cross-sectional view of an example of a variation of the ceramic laminate including the ceramic structure according to the second embodiment of the present disclosure.

FIG. 8 is a schematic cross-sectional view of an example of a variation of the ceramic laminate including the ceramic structure according to the second embodiment of the present disclosure.

A ceramic laminate 201 shown in FIG. 8 has the same structure as the ceramic laminate 1, except that the second ceramic layer 12 is stacked on the first main surface 11*a* of the first ceramic layer 11 and that the other ceramic layers 10 are further stacked on the second ceramic layer 12.

In other words, in FIG. 8, the first ceramic layer 11 is arranged such that the first main surface 11*a* of the first ceramic layer 11 faces downward, and the second ceramic layer 12 and the other ceramic layers 10 are sequentially stacked on the bottom of the first ceramic layer 11.

Thus, in the ceramic laminate 201, the first ceramic layer 11 is the outermost layer, and the second main surface 11*b* of the first ceramic layer 11 is a surface of the ceramic laminate 201.

In addition, the identification mark 20 is located between the first ceramic layer 11 and the second ceramic layer 12 in this structure.

The identification mark 20 is located at a portion preferably 10 μm or more and 50 μm or less, more preferably 25 μm or more and 50 μm or less, away from the surface of the ceramic laminate 201 (i.e., the second main surface 11*b* of the first ceramic layer 11) in the thickness direction.

When the identification mark 20 is located at such a portion, the visibility of the identification mark 20 can be sufficiently ensured. In addition, the external force is not easily transmitted to the identification mark 20, which can prevent cracking in the identification mark 20.

The ceramic laminate 201 may be produced by the method for producing the ceramic laminate according to the first embodiment of the present disclosure, except that in "(4) stacking", a ceramic green sheet that turns into a second ceramic layer is stacked on the first main surface 41*a* of the first ceramic green sheet 41, and other ceramic green sheets are further stacked on the ceramic green sheet that turns into the second ceramic layer to produce a ceramic green sheet stack.

In other words, the first ceramic green sheet 41 is placed on the bottom such that the first main surface 41*a* of the first ceramic green sheet 41 faces upward, and a ceramic green sheet that turns into a second ceramic layer and other ceramic green sheets are sequentially stacked on the first main surface 41*a* of the first ceramic green sheet 41, whereby a ceramic green sheet stack is produced. Then, the ceramic laminate 201 obtained by subsequent steps is turned upside down, whereby the ceramic laminate 201 shown in FIG. 8 can be produced.

Third Embodiment

Next, a ceramic laminate including a ceramic structure according to a third embodiment of the present disclosure is described.

In the ceramic structure according to the third embodiment of the present disclosure, wiring of a circuit pattern, an electrode, and the like is formed in addition to an identification mark on the first main surface of the first ceramic layer. In other words, the wiring and the identification mark are formed on the same layer. Such a ceramic structure is described with reference to the drawings.

Figure 9:
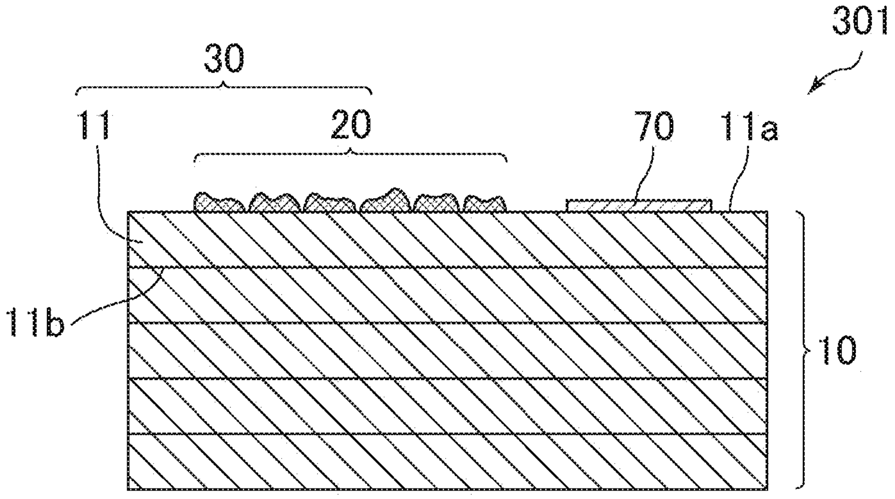
FIG. 9 is a schematic cross-sectional view of an example of a ceramic laminate including a ceramic structure according to a third embodiment of the present disclosure.

FIG. 9 is a schematic cross-sectional view of an example of the ceramic laminate including the ceramic structure according to the third embodiment of the present disclosure.

A ceramic laminate 301 shown in FIG. 9 has the same structure as the ceramic laminate 1, except that wiring 70 of a circuit pattern, an electrode, and the like is formed together with the identification mark 20 on the first main surface 11*a* of the first ceramic layer 11.

With the wiring 70 formed on the first main surface 11*a* of the first ceramic layer 11, the first main surface 11*a* can function as a wiring arrangement surface of a wiring board.

In addition, the wiring 70 formed on the first main surface 11*a* can increase the design freedom of the entire ceramic laminate.

The ceramic laminate 301 may be produced by the method for producing the ceramic laminate according to the first embodiment of the present disclosure, except that a wiring forming conductive paste is printed on the first main surface 41*a* of the first ceramic green sheet 41 between "(3) printing the identification mark slurry" and "(4) stacking".

The wiring forming conductive paste may be printed by screen printing, inkjet printing, gravure printing, or the like.

The wiring forming conductive paste can be prepared by mixing a conductive powder, a plasticizer, and a binder. A co-base material (ceramic material) for adjusting the shrinkage rate may be added to the wiring forming conductive paste.

Next, a variation of the third embodiment of the present disclosure is described.

Figure 10:
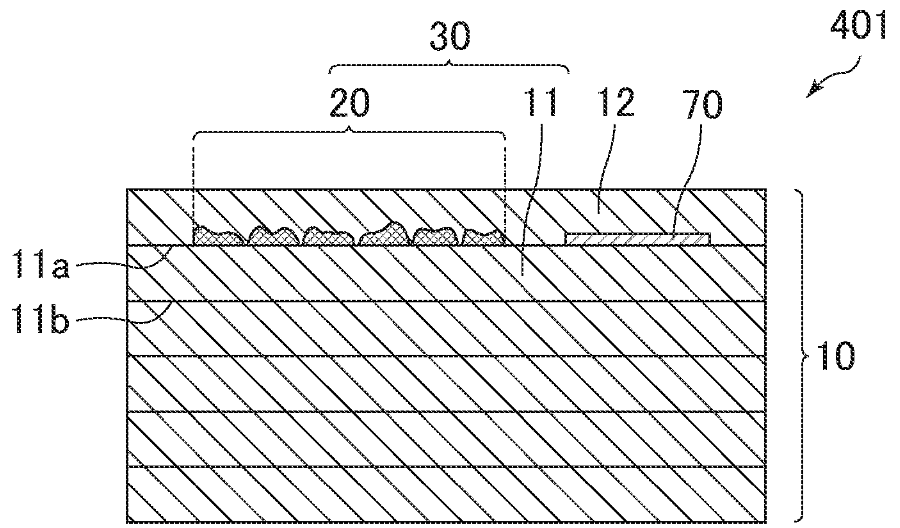
FIG. 10 is a schematic cross-sectional view of an example of a variation of the ceramic laminate including the ceramic structure according to the third embodiment of the present disclosure.

FIG. 10 is a schematic cross-sectional view of an example of a variation of the ceramic laminate including the ceramic structure according to the third embodiment of the present disclosure.

A ceramic laminate 401 shown in FIG. 10 has the same structure as the ceramic laminate 1, except that the wiring 70 of a circuit pattern, an electrode, and the like is formed together with the identification mark 20 on the first main surface 11*a* of the first ceramic layer 11 and also that the second ceramic layer 12 is stacked in contact manner on the first main surface 11*a* of the first ceramic layer 11.

With the wiring 70 formed on the first main surface 11*a* of the first ceramic layer 11, the first main surface 11*a* can function as a wiring arrangement surface of a wiring board.

In addition, the wiring 70 formed on the first main surface 11*a* can increase the design freedom of the entire ceramic laminate.

Further, the identification mark 20 and the wiring 70 are covered with the second ceramic layer 12, so that the identification mark 20 and the wiring 70 are not exposed to the outside.

This can prevent damage to the identification mark 20 and the wiring 70 due to friction or collision with an external member.

In addition, since both the first ceramic layer 11 and the second ceramic layer 12 support the identification mark 20 and the wiring 70, even if stress is generated in the identification mark 20, the identification mark 20 and the wiring 70 are less prone to cracking.

The ceramic laminate 401 may be produced by the method for producing the ceramic laminate according to the first embodiment of the present disclosure, except that a wiring forming conductive paste is printed on the first main surface 41*a* of the first ceramic green sheet 41 between "(3) printing the identification mark slurry" and "(4) stacking", and that in "(4) stacking", another single ceramic green sheet that turns into a second ceramic layer is stacked on the first main surface 41*a* of the first ceramic green sheet 41 to produce a ceramic green sheet stack.

The wiring forming conductive paste may be printed by screen printing, inkjet printing, gravure printing, or the like.

The wiring forming conductive paste can be prepared by mixing a conductive powder, a plasticizer, and a binder. A co-base material (ceramic material) for adjusting the shrinkage rate may be added to the wiring forming conductive paste.

Disclosure in the Present Description

The present description discloses the followings.

Disclosed item (1) relates to a ceramic structure including: a first ceramic layer including a first main surface and a second main surface opposite to the first main surface; and an identification mark made of ceramics on the first main surface of the first ceramic layer, wherein in a cross section of the identification mark in a direction perpendicular to the first main surface, the identification mark includes multiple continuous sections and a discontinuous section between the continuous sections.

Disclosed item (2) relates to the ceramic structure according to Disclosed item (1), wherein a second ceramic layer is stacked in contact manner on the first main surface of the first ceramic layer, and the identification mark is located between the first ceramic layer and the second ceramic layer.

Disclosed item (3) relates to the ceramic structure according to Disclosed item (2), wherein in the cross section of the identification mark in the direction perpendicular to the first main surface, the identification mark is located at a portion 10 μm or more and 50 μm or less away from a surface of the ceramic structure in a thickness direction.

Disclosed item (4) relates to the ceramic structure according to any one of Disclosed items (1) to (3), wherein in the cross section of the identification mark in the direction perpendicular to the first main surface, a width of discontinuous section is smaller than a width of each continuous section adjacent to the discontinuous section.

Disclosed item (5) relates to the ceramic structure according to any one of Disclosed items (1) to (4), wherein in the cross section of the identification mark in the direction perpendicular to the first main surface, each continuous section includes a thin portion that is thin in the thickness direction and a thick portion that is thick in the thickness direction.

Disclosed item (6) relates to the ceramic structure according to any one of Disclosed items (1) to (5), wherein in the cross section of the identification mark in the direction perpendicular to the first main surface, a percentage of a total area of the discontinuous sections relative to a total area of the continuous sections and the discontinuous sections is 20% or more and 50% or less.

Disclosed item (7) relates to the ceramic structure according to any one of Disclosed items (1) to (6), wherein the identification mark contains a glass material and at least one selected from the group consisting of Mn, Co, $Al_2O_3$, $TiO_2$, and $ZrSiO_4$.

Disclosed item (8) relates to the ceramic structure according to any one of Disclosed items (1) to (7), wherein in the cross section of the identification mark in the direction perpendicular to the first main surface, a thickness of the identification mark is 4 μm or more and 10 μm or less.

Disclosed item (9) relates to the ceramic structure according to any one of Disclosed items (1) to (8), wherein the ceramic structure includes the identification mark and wiring on the first main surface of the first ceramic layer.

1, 101, 201, 301, 401 ceramic laminate
10 ceramic layer
11 first ceramic layer
11*a* first main surface
11*b* second main surface
12 second ceramic layer
20 identification mark
21 continuous section
21*a* thin portion of continuous section
21*b* thick portion of continuous section
22 discontinuous section
30 ceramic structure
40 ceramic green sheet
41 first ceramic green sheet
41*a* first main surface
41*b* second main surface
45 ceramic green sheet stack
50 identification mark slurry
51 ceramic material
52 insoluble resin material

61 mesh
62 squeegee
70 wiring

The invention claimed is:

1. A ceramic structure comprising:

a first ceramic layer including a first main surface and a second main surface opposite to the first main surface; and an identification mark comprising ceramics and provided on the first main surface of the first ceramic layer, wherein in a cross section of the identification mark in a direction perpendicular to the first main surface, the identification mark includes multiple continuous sections and one or more discontinuous sections between the continuous sections, and a surface roughness Rz of a surface of each of the continuous sections is 1 μm or more.

2. The ceramic structure according to claim 1, further comprising:

a second ceramic layer stacked in contact manner on the first main surface of the first ceramic layer, wherein the identification mark is located between the first ceramic layer and the second ceramic layer.

3. The ceramic structure according to claim 2, wherein in the cross section of the identification mark in the direction perpendicular to the first main surface, the identification mark is located at a portion 10 μm to 50 μm away from a surface of the ceramic structure in a thickness direction.

4. The ceramic structure according to claim 3, wherein in the cross section of the identification mark in the direction perpendicular to the first main surface, a width of each of the discontinuous sections is less than a width of each of the continuous sections adjacent to each discontinuous section.

5. The ceramic structure according to claim 3, wherein in the cross section of the identification mark in the direction perpendicular to the first main surface, each of the continuous sections includes a thin portion and a thick portion that is thicker than the thin portion in the thickness direction.

6. The ceramic structure according to claim 3, wherein in the cross section of the identification mark in the direction perpendicular to the first main surface, a percentage of a total area of the discontinuous sections relative to a total area of the continuous sections and the discontinuous sections is 20% to 50%.

7. The ceramic structure according to claim 3, wherein the identification mark contains a glass material and at least one selected from the group consisting of Mn, Co, $Al_2O_3$, $TiO_2$, and $ZrSiO_4$.

8. The ceramic structure according to claim 2, wherein in the cross section of the identification mark in the direction perpendicular to the first main surface, a width of each of the discontinuous sections is less than a width of each of the continuous sections adjacent to each discontinuous section.

9. The ceramic structure according to claim 2, wherein in the cross section of the identification mark in the direction perpendicular to the first main surface, each of the continuous sections includes a thin portion and a thick portion that is thicker than the thin portion in the thickness direction.

10. The ceramic structure according to claim 2, wherein in the cross section of the identification mark in the direction perpendicular to the first main surface, a percentage of a total area of the discontinuous sections relative to a total area of the continuous sections and the discontinuous sections is 20% to 50%.

11. The ceramic structure according to claim 2, wherein the identification mark contains a glass material and at least one selected from the group consisting of Mn, Co, $Al_2O_3$, $TiO_2$, and $ZrSiO_4$.

12. The ceramic structure according to claim 1, wherein in the cross section of the identification mark in the direction perpendicular to the first main surface, a width of each of the discontinuous sections is less than a width of each of the continuous sections adjacent to each discontinuous section.

13. The ceramic structure according to claim 12, wherein in the cross section of the identification mark in the direction perpendicular to the first main surface, each of the continuous sections includes a thin portion and a thick portion that is thicker than the thin portion in the thickness direction.

14. The ceramic structure according to claim 12, wherein in the cross section of the identification mark in the direction perpendicular to the first main surface, a percentage of a total area of the discontinuous sections relative to a total area of the continuous sections and the discontinuous sections is 20% to 50%.

15. The ceramic structure according to claim 1, wherein in the cross section of the identification mark in the direction perpendicular to the first main surface, each of the continuous sections includes a thin portion and a thick portion that is thicker than the thin portion in the thickness direction.

16. The ceramic structure according to claim 15, wherein in the cross section of the identification mark in the direction perpendicular to the first main surface, a percentage of a total area of the discontinuous sections relative to a total area of the continuous sections and the discontinuous sections is 20% to 50%.

17. The ceramic structure according to claim 1, wherein in the cross section of the identification mark in the direction perpendicular to the first main surface, a percentage of a total area of the discontinuous sections relative to a total area of the continuous sections and the discontinuous sections is 20% to 50%.

18. The ceramic structure according to claim 1, wherein the identification mark contains a glass material and at least one selected from the group consisting of Mn, Co, $Al_2O_3$, $TiO_2$, and $ZrSiO_4$.

19. The ceramic structure according to claim 1, wherein in the cross section of the identification mark in the direction perpendicular to the first main surface, a thickness of the identification mark is 4 μm to 10 μm.

20. The ceramic structure according to claim 1, further comprising:

wiring together with the identification mark on the first main surface of the first ceramic layer.

* * * * *